July 9, 1963
R. J. COFFEY
3,096,612
CHAIN MAKING MACHINE WITH MEANS FOR
TRIMMING WELDING BURR
Filed May 16, 1961
3 Sheets-Sheet 3
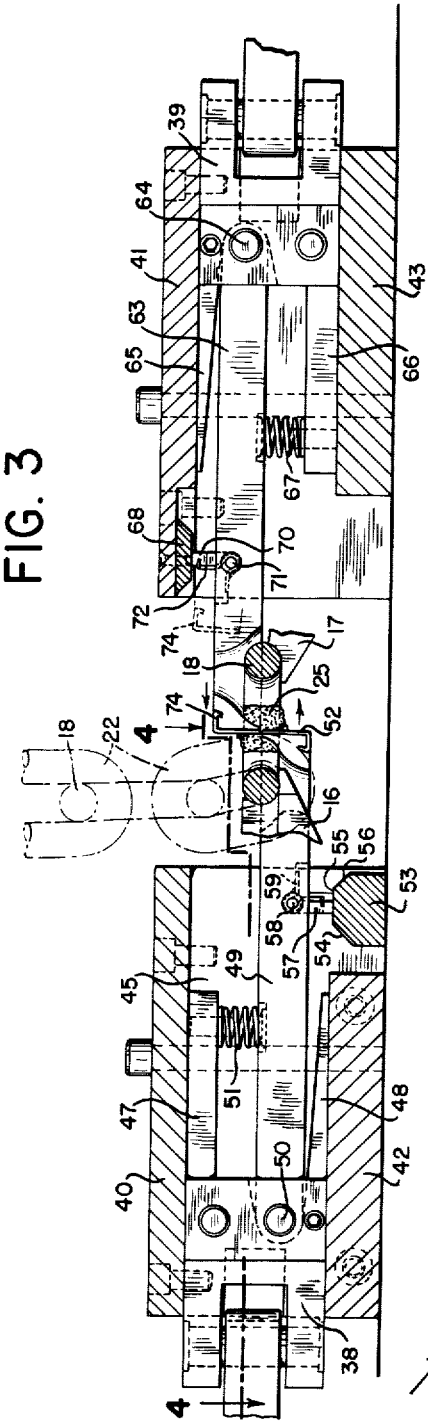
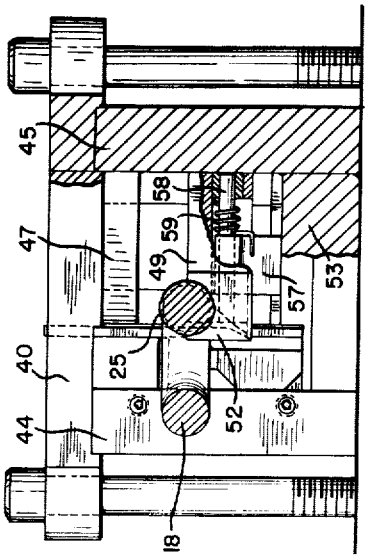
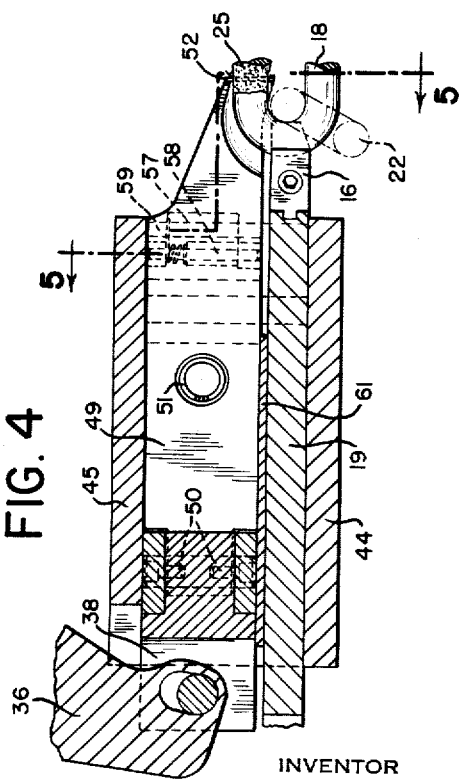
INVENTOR
Ralph J. Coffey
BY
ATTORNEYS

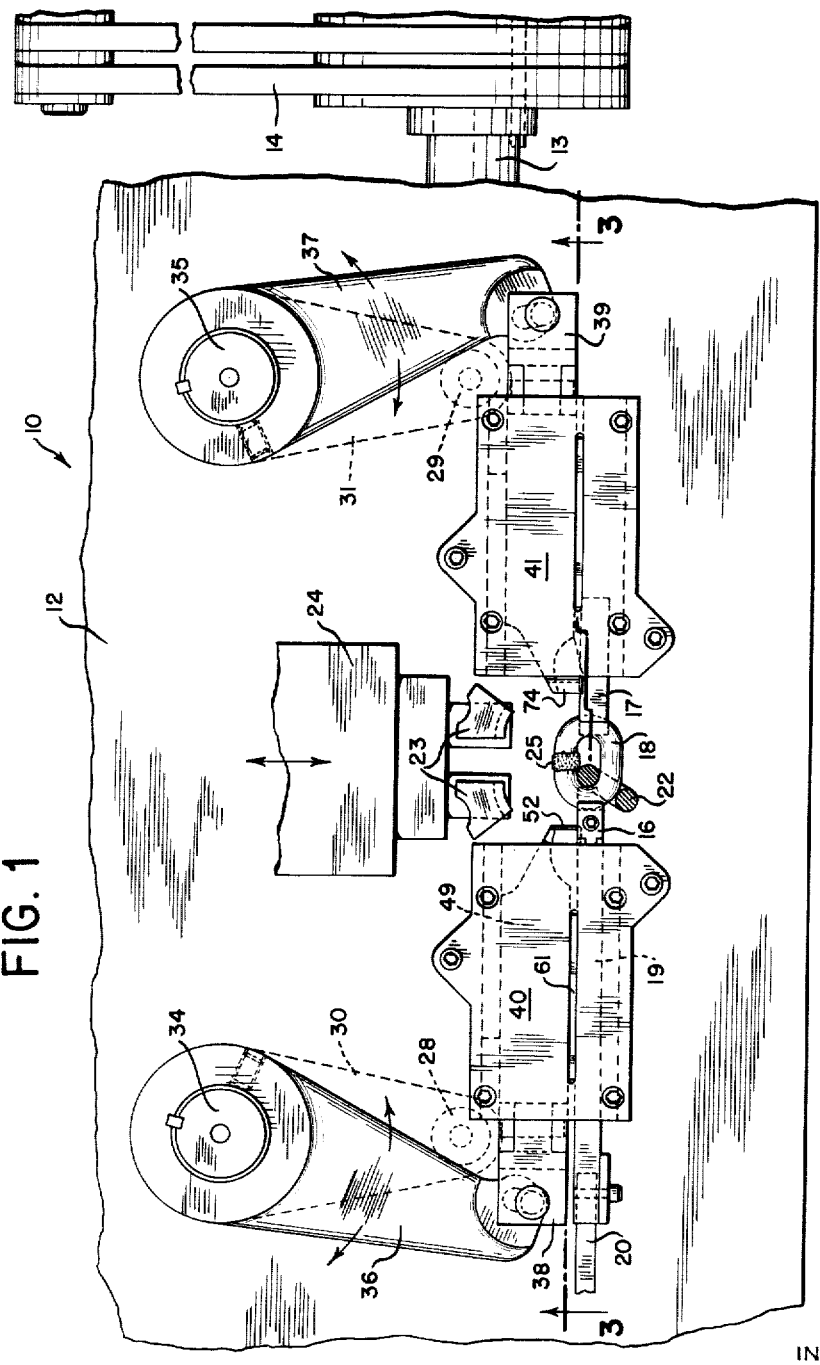

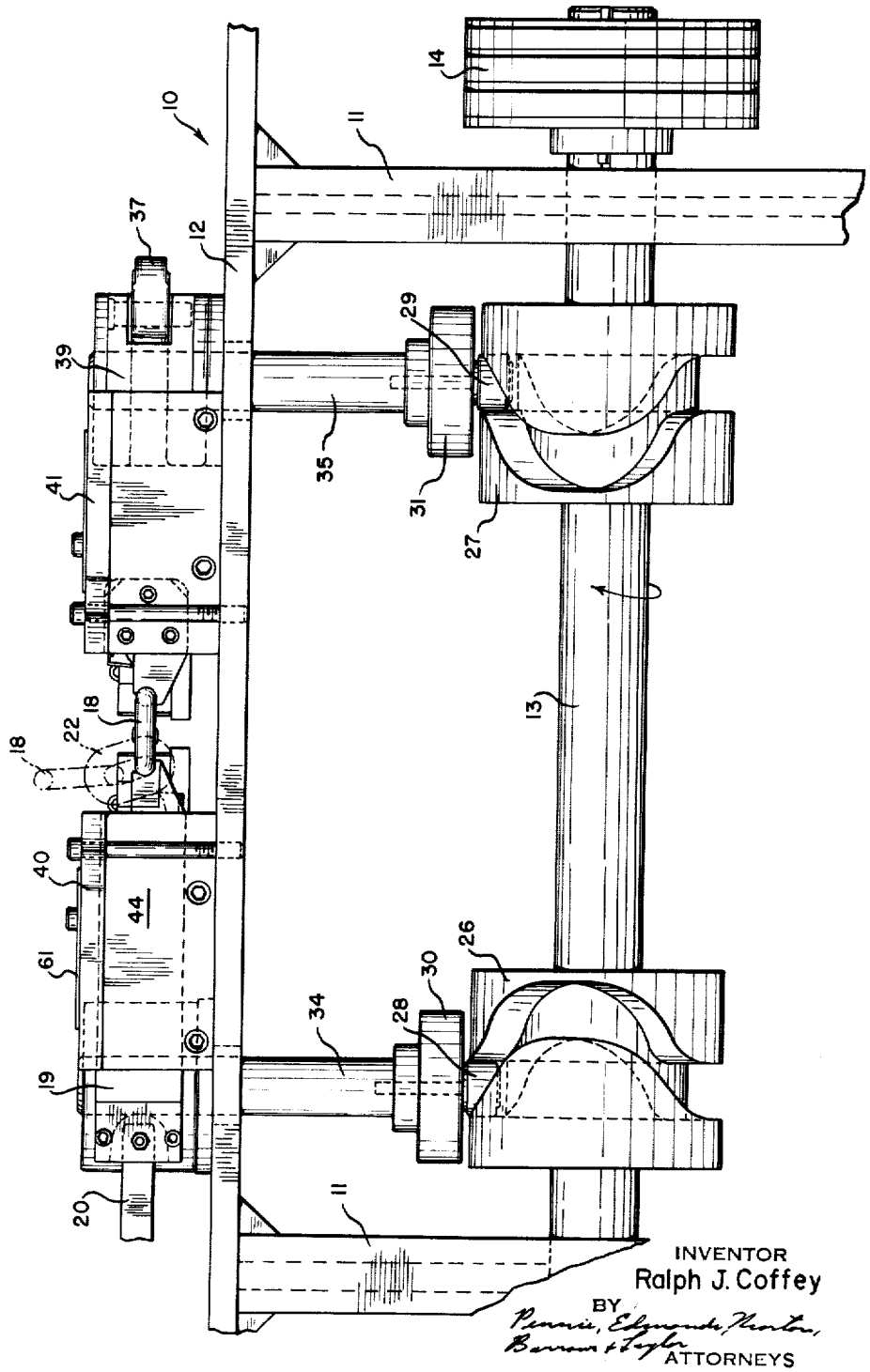

United States Patent Office 3,096,612
Patented July 9, 1963

3,096,612
CHAIN MAKING MACHINE WITH MEANS
FOR TRIMMING WELDING BURR
Ralph J. Coffey, York, Pa., assignor to American Chain &
Cable Company, Inc., a corporation of New York
Filed May 16, 1961, Ser. No. 110,449
11 Claims. (Cl. 59—22)

This invention relates to apparatus for trimming excess material from opposite sides of a workpiece. More particularly, it relates to novel trimming apparatus for use in a chain-making machine to remove excess weld metal encircling the cojoined end portions of lugs which are newly formed into links.

There are many instances in fabricating processes where excess material must be removed from a workpiece in regions which are practically inexcessible to automatic cutting tools. One such example is in chain-making apparatus where C-shaped lugs are succesively closed about the endmost link of previously formed chain and the lug end portions are welded together to form a new link. A circumferential band of excess weld metal usually results around the cojoined lug end portions and it should be trimmed away automatically while the newly formed link is still held by the closing dies. Such an operation is made extremely difficult by the interference of the closing dies and their supports and the previously formed chain link which extends through the one to be trimmed, and also because the cutting tool must operate within the annular link so that the inner circumferential surface is trimmed cleanly.

Heretofore, no trimming device has been available which is capable of satisfactorily carrying out operations of this type. The apparatus provided by this invention does accomplish the purpose, however, and it does so automatically and with complete effectiveness. The new apparatus has been specifically developed for the weld-trimming step in a chain-making process but its advantages make it equally applicable to many other trimming operations, particularly where excess material is to be removed from opposite sides of a workpiece.

Broadly stated, the trimming apparatus of the invention comprises a frame and means for holding the workpiece on the frame. Sliding means are mounted on the frame for reciprocation toward and away from the workpiece. A pair of tool supports are mounted on the sliding means and reciprocable thereby alongside the opposite sides of the workpiece. Means are included for permitting lateral displacement of the tool supports on the sliding means. A pair of cutting tools are provided on the respective tool supports. Cam means are provided on the frame in the path of reciprocation on the tool supports for periodically displacing the supports laterally to move the tools into trimming contact with the opposite sides of the workpiece.

In more specific forms of the invention, the tool supports may be elongated and pivoted at one end to the sliding means to extend forwardly to opposite sides of the workpiece. The cam means then serves to periodically pivot the supports laterally to move the tools into trimming contact with the opposite sides of the workpiece. Also, a pair of opposed aligned slides may be provided for reciprocation toward and away from the workpiece with the workpiece therebetween. In such case, the tool supports are mounted on the respective slides. Spring means may urge each of the tool supports laterally on the sliding means away from the workpiece and a pair of followers may be mounted on the respective supports to engage the cams. Such followers may be pivoted to and spring-mounted on the respective supports to be tripped out of operating position while re-engaging the cams on the return stroke of the sliding means.

This new apparatus is particuladly suitable for use in a chain-making machine which includes a frame, a pair of dies relatively movable on the frame for successively closing C-shaped lugs about the endmost link of previously formed chain, and welding means movable on the frame for successively cojoining the closed end portions while the lugs are held by the dies. As a result of the new arrangement of longitudinal sliding means, laterally displaceable tool supports, and actuating cams, the tools carried by the supports are adapted to move forwardly alongside the held lug, then inwardly so that the cutting tools engage the lug end potrion, then forwardly through a cutting stroke which removes opposite circumferential halves of the excess weld metal and finally out away from the lug. This combination of movements permits the tool to remove the excess weld metal automatically and with complete effectiveness, notwithstanding the fact that the previously formed chain link its fitted through the link being trimmed and the dies are still in closed position on the opposite rounded ends of the new link.

A preferred embodiment of the new apparatus is described below with reference to the accompanying drawings, wherein FIG. 1 is a fragmentary plan view of a portion of a chain-making machine which includes the new trimming apparatus;

FIG. 2 is a fragmentary elevation of the apparatus of FIG. 1;

FIG. 3 is a fragmentary section taken along the line 3—3 of FIG. 1 and showing the trimming tools in the middle of their cutting stroke;

FIG. 4 is a fragmentary section taken along the line 4—4 of FIG. 3; and

FIG. 5 is an enlarged section taken along the line 5—5 of FIG. 4.

Referring first to FIGS. 1 and 2, a chain-making machine is shown which includes a heavy frame 10 constructed of standards 11 and and a top plate 12. Extending from the frame beneath the plate 12 is a main drive shaft 13 which is rotated by belts 14 driven by any suitable power source. On top of the plate 12, opposed closing dies 16 and 17 are located to receive a lug 18. The die 17 is affixed to the frame and the die 16 is mounted on a slide 19 which is actuated by a rod 20. The rod 20 may be periodically reciprocated in any suitable manner to displace the die 16 toward the die 17 and close the lug 18 therebetween. If desired, a suitable cam and linkage arrangement may be used to actuate the rod 20 by means of the drive shaft 13.

Before the lug 18 is placed between the closing dies 16 and 17, it is C-shaped. It is first hooked through a previously formed link 22 of the chain which is drawn upwardly as shown in FIG. 2. Then, it is squeezed between the closing dies so that the end portions thereof come together. At that point, a pair of welding electrodes 23 supported on a slide 24 (which may also be actuated by the drive shaft 13) come forward to weld the cojoined lug end portions together. When this welding operation is complete, an annular band of excess weld metal 25 is disposed about the cojoined lug end portions. The slide 24 then withdraws to retract the electrodes 23 and the apparatus appears as shown in FIG. 1 in readiness for the trimming apparatus of the invention which removes the excess weld metal 25.

The new trimming apparatus includes a pair of endless-groove cams 26 and 27 mounted about the main drive shaft 13. Within the grooves of the respective cams ride rotatable followers 28 and 29 which depend from the outer ends of arms 30 and 31. These arms are affixed to respective shafts 34 and 35 which are rotatably mounted in and extend through the top plate 12 of the frame 10. Arms 36 and 37 extend rigidly from the respective upper ends of the shafts 34 and 35 and the outer ends of the arms 36 and 37 are suitably linked to opposed aligned slides 38 and 39.

Referring to FIGS. 3 through 5, the slides 38 and 39 are contained between upper plates 40 and 41 respectively and lower plates 42 and 43 respectively. Side plates 44 and 45 contain the slide 38 laterally, and that construction is also typical of the slide 39. Consequently, the slides 38 and 39 are adapted to move toward and away from one another with the closed lug 18 therebetween upon actuation of the main drive shaft 13.

The slide 38 includes two opposed upper and lower forwardly projecting portions 47 and 48. An elongated tool support 49 is pivoted about pins 50 on the slide 38 and extends forwardly between the portions 47 and 48. A compression spring 51 is mounted between the slide portion 47 and the upper surface of the tool support 49 and urges the tool support in a clockwise direction as shown in FIG. 3 downwardly away from the held lug 18. This arrangement permits lateral pivotal displacement of the tool support 49 against the force of the compression spring 51.

At the outer end of the tool support 49, a trimming tool 52 is removably attached. The tool 52 has a cutting edge conforming to the lower circumferential half of the desired cross section of the welding metal 25. It is simply clipped in place so that it can be readily substituted by a tool of a different size.

Also affixed to the frame is a cam 53 which has a cam surface including a first included portion 54, a flat plateau 55, and a second inclined portion 56. A follower 57 adapted to cooperate with this cam is pivotally mounted about a pin 58 seated in the tool support 49. The follower 57 is abutted so that it can be pivoted no further in a clockwise direction than the downwardly depending position shown in FIG. 3. However, it can pivot forwardly, i.e., in a counterclockwise direction as shown in FIG. 3. A grasshopper spring 59 is disposed about the pivot pin 58 and engages the follower 57 at one end in the usual manner in order to return the follower to the downwardly depending position shown whenever it is free to do so.

It will also be noted in reference to FIGS. 1, 2, 4 and 5 that the slide 19 on which the closing die 16 is mounted is adapted to reciprocate between the side plate 44 and the slide 38 and tool support 49. A removable spacer plate 61 is fitted through a slot in the upper plate 40 to separate the slide 19 from the slide 38 and attached tool support 49.

As shown in all the figures, the assembly associated with the opposite slide 39 is substantially identical to that described above with reference to the slide 38, with the exception that certain of the parts are inverted in the slide 39 assembly. Thus, the slide 39 has a tool support 63 pivoted thereto about pins 64 to move between an upper portion 65 and a lower portion 66 of the slide 39. A compression spring 67 urges the tool support 63 in a clockwise direction as shown in FIG. 3 upwardly away from the plane of the held lug 18. Affixed to the upper plate 41 is a cam 68 having first and second inclined portions and a central plateau portion similar to the cam 53. A follower 70 is pivoted about a pin 71 on the tool support 63 and is abutted so as not to turn rearwardly from the upright position shown in FIG. 3. The follower 70 can be tripped forwardly, however, but it is returned to upright position by a grasshopper spring 72. At the outer end of the tool support 63 is a removable tool 74 having a cutting edge conforming to the upper circumferential half of the cross section desired in the welding metal 25 on the lug 18.

The operation of the new trimming apparatus, as employed in a chain-making machine, is as follows: An open C-shaped lug 18 is inserted through the endmost link 22 of previously formed chain and is then located between the closing dies 16 and 17. The movable closing die 16 is displaced toward the stationary die 17 by means of the rod 20 acting upon the slide 19 and the C-shaped lug is squeezed closed until its end portions adjoin. Then, the slide 24 moves forwardly until the electrodes 23 are in engagement with the lug end portions and current is passed between the electrodes to effect a weld which cojoins the end portions. An annular band of excess weld metal 25 thus results around the cojoined lug end portions. The slide 24 is then withdrawn to retract the electrodes 23.

The main drive shaft 13 (which may be used to actuate the welding electrode slide 24 and the movable closing die 16) then rotates the trimming apparatus cams 26 and 27 to the point where the followers 28 and 29 are moved toward one another longitudinally with respect to the drive shaft axis. As seen in FIG. 1, this causes counterclockwise and clockwise movement of the arms 36 and 37 respectively and the slides 38 and 39 move toward the held lug.

At the beginning of this motion of the slide 38, the follower 57 on the tool support 49 does not yet engage the cam 53, and the compression spring 51 therefore holds the support 49 downwardly against the slide portion 48. Hence, the tool 52 at the outer end of the support is off-set downwardly below the plane of the held lug 18. Similarly, the follower 70 on the other tool support 63 does not yet engage the cam 68 on the compression spring 67 therefore holds the support 63 against the slide portion 65. Consequently, the tool 74 at the outer end of the support 63 is off-set upwardly away from the plane of the held lug 18 (in the fragmentary dotted position shown in FIG. 3).

As the slide 38 moves toward the held lug 18, the follower 57 engages the first inclined portion 54 of the cam 53. This occurs after the tool 52 passes beneath the rounded end portion of the lug 18 which is gripped by the closing die 16. Since the follower 57 cannot pivot rearwardly, it remains rigid with respect to the support 49 and rides up the inclined portion 54. This pivots the support 49 laterally upwardly about the pins 50 and brings the tool 52 at its outer end up against the lower circumferential half of the adjacent lug end portion. As the slide 38 moves further in a forward direction, the follower 57 slides along the central plateau portion 55 of the cam 53. This prevents further lateral displacement of the tool 52 and causes it to cut through the excess weld metal 25. The plateau 55 is sufficiently long so that when the follower 57 reaches the end thereof and starts down the second inclined portion 56 of the cam 53, the tool 52 has cut through the length of the excess weld metal. The spring 51 urges the support 49 downwardly as the follower 57 rides down the second inclined portion 56 and thus moves the support laterally downwardly to withdraw the tool 52 away from the held lug 18.

Shortly thereafter, the cam 26 moves the arm 30 in a clockwise direction as shown in FIG. 1 and thereby causes the arm 36 to start the slide 38 rearwardly on its return stroke. When the follower 57 re-engages the cam 53 at the second inclined portion 56, it is pivoted forwardly against the force of the grasshopper spring 59 and is thus rendered inoperative for purposes of laterally displacing the tool support 49. Consequently, the tool support 49 remains at its downward position against the slide portion 48 and the follower 57 simply trips over the cam 53. This prevents the tool 52 from returning into engagement with the cleanly trimmed underside of the held lug 18.

The operation of the other slide assembly is substantially the same. The follower 70 engages the first inclined portion of the cam 68 on the forward cutting stroke and pivots the support 63 laterally downwardly so that the tool 74 engages the adjacent lug end portion. Then, as the follower 70 moves along the plateau of the cam 68, the tool 74 removes the upper circumferential half of the excess weld metal 25. Upon moving down the second inclined portion of the cam 68, the follower 70 permits the support 63 to be pivoted laterally upwardly by the spring 67 to retract the tool 74 away from the lug 18.

On the return stroke, the pivoted spring-mounted follower 70 trips over the cam 68 and prevents the tool 74 from moving back into engagement with the lug 18 on the return stroke.

As shown in FIG. 3, it is desirable to synchronize the action of the two opposed trimming assemblies so that the trimming tools 52 and 74 engage the lug 18 at the same time, pass one another at the center of the cojoined lug end portions, and withdraw away from the lug at the same time. In order to adapt this apparatus to the trimming of various sizes and shapes of lugs, it is necessary simply to employ different cutting tools 52 and 74 and cams 53 and 68. It is clear that the size and shape of the cutting edge of the tools 52 and 74 are dependent upon the desired cross section at the cojoined lug end portions. The cams will vary insofar as the length of the plateau 55 and the distance thereof from the plane of the held lug 18 determine the point at which the tools engage the lugs and the extent to which they laterally cut into the excess weld metal.

I claim:

1. Apparatus for trimming excess material from opposite sides of a workpiece comprising a frame, means for holding said workpiece on said frame, sliding means mounted on said frame for reciprocation toward and away from said workpiece, a pair of tool supports mounted on said sliding means and reciprocable thereby alongside the opposite sides of said workpiece, means for permitting lateral displacement of said tool supports relative to the path of reciprocation of said sliding means, a pair of cutting tools on the respective tool supports, and cam means on said frame in the path of reciprocation of said tool supports for periodically effecting said lateral displacement of said supports to move said tools into trimming contact with the opposite sides of said workpiece.

2. Apparatus for trimming excess material from opposite sides of a workpiece comprising a frame, means for holding said workpiece on said frame, sliding means mounted on said frame for reciprocation toward and away from said workpiece, a pair of elongated tool supports pivoted at one end to said sliding means and extending forwardly toward opposite sides of said workpiece, whereby said supports are reciprocable with said sliding means and laterally pivotal relative to the path of reciprocation thereof, a pair of cutting tools on the outer ends of the respective tool supports, and cam means on said frame in the path of reciprocation of said tool supports for periodically pivoting said supports laterally to move said tools into trimming contact with the opposite sides of said workpiece.

3. Apparatus for trimming excess material from opposite sides of a workpiece comprising a frame, means for holding said workpiece on said frame, a pair of opposed aligned slides mounted on said frame for reciprocation toward and away from said workpiece with the workpiece therebetween, a pair of tool supports mounted on the respective slides and reciprocable thereby alongside the opposite sides of said workpiece, means for permitting lateral displacement of said tool supports relative to the path of reciprocation of the slides, a pair of cutting tools on the respective tool supports, and cam means on said frame in the path of reciprocation of said tool supports for periodically effecting said lateral displacement of said supports to move said tools into trimming contact with the opposite sides of said workpiece.

4. Apparatus for trimming excess material from opposite sides of a workpiece comprising a frame, means for holding said workpiece on said frame, sliding means mounted on said frame for reciprocation toward and away from said workpiece, a pair of tool supports mounted on said sliding means and reciprocable thereby alongside the opposite sides of said workpiece, means for permitting lateral displacement of said tool supports relative to the path of reciprocation of said sliding means, spring means urging each support laterally on the sliding means away from said workpiece, a pair of cutting tools on the respective tool supports, a pair of cams on said frame, and a pair of followers mounted on the respective supports to engage the cams during a portion of the sliding means stroke to periodically effect said lateral displacement of said supports against said spring means and move said tools into trimming contact with the opposite sides of said workpiece, said followers being pivoted to and spring-mounted on the respective supports to be tripped out of operating position while re-engaging said cams on the return stroke of the sliding means.

5. Apparatus for trimming excess material from opposite sides of a workpiece comprising a frame, means for holding said workpiece on said frame, sliding means mounted on said frame for reciprocation toward and away from said workpiece, a pair of elongated tool supports pivoted at one end to said sliding means and extending forwardly toward opposite sides of said workpiece, whereby said supports are reciprocable with said sliding means and laterally pivotal relative to the path of reciprocation thereof, spring means urging each support about its pivotal mounting on the sliding means laterally away from said workpiece, a pair of cutting tools on the respective tool supports, a pair of cams on said frame, and a pair of followers mounted on the respective supports to engage the cams during a portion of the sliding means stroke to periodically effect the lateral pivoting of said supports and move said tools into trimming contact with the opposite sides of said workpiece, said followers being pivoted to and spring-mounted on the respective supports to be tripped out of operating position while re-engaging said cams on the return stroke of the sliding means.

6. Apparatus for trimming excess material from opposite sides of a workpiece comprising a frame, means for holding said workpiece on said frame, a pair of opposed aligned slides mounted on said frame for reciprocation toward and away from said workpiece with the workpiece therebetween, a pair of elongated tool supports pivoted at one end to the respective slides and extending forwardly toward opposite sides of said workpiece, whereby said supports are reciprocable with said respective slides and laterally pivotal relative to the path of reciprocation thereof, spring means urging each support about its pivotal mounting on the respective slides laterally away from said workpiece, a pair of cutting tools on the respective tool supports, a pair of cams on said frame, and a pair of followers mounted on the respective supports to engage the cams during a portion of the stroke of the slides to periodically effect the lateral pivoting of said supports and move said tools into trimming contact with the opposite sides of said workpiece, said followers being pivoted to and spring-mounted on the respective supports to be tripped out of operating position while re-engaging said cams on the return stroke of the slides.

7. In a chain-making machine which includes a frame, a pair of dies relatively movable on said frame for successively closing C-shaped lugs about the endmost link of previously formed chain, and welding means movable on said frame for successively cojoining the closed lug end portions while the lugs are held by said dies, the improvement which comprises apparatus for trimming excess weld metal encircling the cojoined lug end portions, said apparatus comprising sliding means mounted on said frame for reciprocation toward and away from the held lug in a direction longitudinal to the cojoined lug end portions, a pair of tool supports mounted on said sliding means and movable thereby alongside the opposite sides of the cojoined lug end portions, means for permitting lateral displacement of said tool supports relative to the path of reciprocation of said sliding means, a pair of cutting tools on the respective tool supports, said tools having cutting edges together defining the desired peripheral cross sectional contour of the cojoined lug end portions, and cam means on said frame in the path of reciprocation of said tool supports for periodically effecting said lateral displacement of said supports to move said tools together into trimming contact with the opposite circumferential halves of the excess weld metal encircling said cojoined lug end portions.

8. In a chain-making machine which includes a frame, a pair of dies relatively movable on said frame for successively closing C-shaped lugs about the endmost link of previously formed chain, and welding means movable on said frame for successively cojoining the closed lug end portions while the lugs are held by said dies, the improvement which comprises apparatus for trimming excess weld metal encircling the cojoined lug end portions, said apparatus comprising sliding means mounted on said frame for reciprocation toward and away from the held lug in a direction longitudinal to the cojoined lug end portions, a pair of elongated tool supports pivoted at one end to said sliding means and extending forwardly toward opposite sides of the cojoined lug end portions, whereby said supports are reciprocable with said sliding means and laterally pivotal relative to the path of reciprocation thereof, a pair of cutting tools on the outer ends of the respective tool supports, said tools having cutting edges together defining the desired peripheral cross sectional contour of the cojoined lug end portions, and cam means on said frame in the path of reciprocation of said tool supports for periodically effecting the lateral pivoting of said supports to move said tools together into trimming contact with the opposite circumferential halves of the excess weld metal encircling the cojoined lug end portions.

9. In a chain-making machine which includes a frame, a pair of dies relatively movable on said frame for successively closing C-shaped lugs about the endmost link of previously formed chain, and welding means movable on said frame for successively cojoining the closed lug end portions while the lugs are held by said dies, the improvement which comprises apparatus for trimming excess weld metal encircling the cojoined lug end portions, said apparatus comprising a pair of opposed aligned slides spaced apart on said frame with the held lug therebetween for reciprocation toward and away from the held lug in a direction longitudinal to the cojoined lug end portions, a pair of tool supports mounted on the respective slides and reciprocable thereby alongside the opposite sides of the cojoined lug end portions, means for permitting lateral displacement of said tool supports relative to the path of reciprocation of the slides, a pair of cutting tools on the respective tool supports, said tools having cutting edges together defining the desired peripheral cross sectional contour of the cojoined lug end portions, and cam means on said frame in the path of reciprocation of said tool supports for periodically effecting said lateral displacement of said supports to move said tools together into trimming contact with the opposite circumferential halves of the excess weld metal encircling the cojoined lug end portions.

10. In a chain-making machine which includes a frame, a pair of dies relatively movable on said frame for sucessively closing C-shaped lugs about the endmost link of previously formed chain, and welding means movable on said frame for successively cojoining the closed lug end portions while the lugs are held by said dies, the improvement which comprises apparatus for trimming excess weld metal encircling the cojoined lug end portions, said apparatus comprising sliding means mounted on said frame for reciprocation toward and away from the held lug in a direction longitudinal to the cojoined lug end portions, a pair of tool supports mounted on said sliding means and reciprocable thereby alongside the opposite sides of the cojoined lug end portions, means for permitting lateral displacement of said tool supports relative to the path of reciprocation of said sliding means, spring means urging each support laterally on the sliding means away from the held lug, a pair of cutting tools on the respective tool supports, said tools having cutting edges together defining the desired peripheral cross sectional contour of the cojoined lug end portions, a pair of cams on said frame, and a pair of followers mounted on the respective supports to engage the cams during a portion of the sliding means stroke to periodically effect said lateral displacement of said supports against said spring means and move said tools into trimming contact with the opposite circumferential halves of the excess weld metal encircling the cojoined lug end portions, said followers being pivoted to and spring-mounted on the respective supports to be tripped out of operating position while re-engaging said cams on the return stroke of the sliding means.

11. In a chain-making machine which includes a frame, a pair of dies relatively movable on said frame for successively closing C-shaped lugs about the endmost link of previously formed chain, and welding means movable on said frame for successively cojoining the closed lug end portions while the lugs are held by said dies, the improvement which comprises apparatus for trimming excess weld metal encircling the cojoined lug end portions, said apparatus comprising a pair of opposed aligned slides spaced apart on said frame with the held lug therebetween for reciprocation toward and away from the held lug in a direction longitudinal to the cojoined lug end portions, a pair of elongated tool supports pivoted at one end to the respective slides and extending forwardly toward opposite sides of the cojoined lug end portions, whereby said supports are reciprocable with said respective slides and laterally pivotal relative to the path of reciprocation thereof, spring means urging each support about its pivotal mounting on the respective slides laterally away from the held lug, a pair of cutting tools on the respective tool supports, said tools having cutting edges together defining the desired peripheral cross sectional contour of the cojoined lug end portions, a pair of cams on said frame, and a pair of followers mounted on the respective supports to engage the cams during a portion of the stroke of the slides to periodically effect the lateral pivoting of said supports and move said tools together into trimming contact with the opposite circumferential halves of the excess weld metal encircling the cojoined lug end portions, said followers being pivoted to and spring-mounted on the respective supports to be tripped out of operating position while re-engaging said cams on the return stroke of the slides.

No references cited.

UNITED STATES PATENT OFFICE
CERTIFICATE OF CORRECTION

Patent No. 3,096,612 July 9, 1963

Ralph J. Coffey

It is hereby certified that error appears in the above numbered patent requiring correction and that the said Letters Patent should read as corrected below.

Column 2, line 12, for "potrion" read -- portion --; column 3, line 29, for "included" read -- inclined --; column 5, line 18, for "lugs" read -- lug --; line 48, for "pivoting said supports laterally" read -- effecting the lateral pivoting of said supports --.

Signed and sealed this 14th day of January 1964.

(SEAL)
Attest:
ERNEST W. SWIDER

Attesting Officer

EDWIN L. REYNOLDS

Acting Commissioner of Patents